(12) United States Patent
Okada

(10) Patent No.: US 6,293,683 B1
(45) Date of Patent: Sep. 25, 2001

(54) SPREAD ILLUMINATING APPARATUS

(75) Inventor: Masafumi Okada, Iwata-gun (JP)

(73) Assignee: Minebea Co. Ltd., Nakano-ken (JP)

( * ) Notice: Subject to any disclaimer, the term of this patent is extended or adjusted under 35 U.S.C. 154(b) by 0 days.

(21) Appl. No.: 09/459,896

(22) Filed: Dec. 14, 1999

(30) Foreign Application Priority Data

Jul. 19, 1999 (JP) ................................................ 11-204531

(51) Int. Cl.$^7$ ....................................................... F21V 7/00
(52) U.S. Cl. ................. 362/31; 362/26; 362/27; 362/561; 362/559; 362/560; 362/558
(58) Field of Search ................. 362/31, 26, 27, 362/561, 559, 560, 558

(56) References Cited

U.S. PATENT DOCUMENTS

| | | | |
|---|---|---|---|
| 5,655,827 | * 8/1997 | Kaneko et al. ........................ | 362/31 |
| 5,883,684 | * 3/1999 | Millikan et al. ....................... | 345/65 |
| 5,915,855 | 6/1999 | Murase et al. ......................... | 40/546 |

FOREIGN PATENT DOCUMENTS 10-182076    7/1998  (JP) .

* cited by examiner

*Primary Examiner*—Thomas M. Sember
*Assistant Examiner*—Ali Alavi
(74) *Attorney, Agent, or Firm*—Oliff & Berridge, PLC.

(57) ABSTRACT

In a spread illuminating apparatus wherein on one end of a transparent substrate, a light conductive member 3 on one portion of which a prism shape portion 3a is provided, light emitted from the light conductive member 3 enters the transparent substrate, the length of the light conductive member is set larger than the width dimension of the transparent substrate 2 with which the light conductive member 3 is disposed parallel each other, the end of the light conductive member to which the light emitting diode is positioned is projected from the width end of the transparent substrate 2.

2 Claims, 2 Drawing Sheets

SPREAD ILLUMINATING APPARATUS

BACKGROUND OF THE INVENTION

1. Field of the Invention

The present invention relates to a spread illuminating apparatus for a personal computer and a word processor and so on (hereinafter referred as "person-com") or a display portion of a miniaturized and portable information appliances.

2. Related Art

For a display of a person-com, a cathode ray tube has been primarily used, however, since this type is not only large-size and heavy weight, but also high energy consumption, recently, a liquid crystal panel has mostly used. For that reason, what is a great numbers in pixels of liquid crystal panel has been developed, further, since the miniaturization of electronic circuit elements has also been developed, person-coms of note book type has been rapidly spread. Further, a liquid crystal panel has widely used for a display of every electronic appliance such as a miniaturized and portable information apparatus other than the above person-com.

Thus, the demand for liquid crystal panel has rapidly increased. But, since the liquid crystal panel itself does not emit a light, an illumination apparatus becomes necessary. Conventionally, a display comparatively large for such as person-com, a cold cathode fluorescent lamp (CCFL) or a hot cathode fluorescent tube has been used. In either case, due to a fluorescent lamp, in order to discharge between electrodes, a high voltage becomes necessary. Therefore, an oscillating circuit using semi-conductors is provided and the voltage generated in oscillating is supplied to a fluorescent lamp. Further, in a display of comparatively small area such as portable telephone, a light emitting body such as an organic electro-luminescence (EL element) has been used.

Since a person-com is an aggregation of electrical circuit and electric devices, it consumes much electric power. Therefore, a study for saving electric power has been developed and at present, what is outstandingly small in electric energy consumption comparing with the conventional ones can be available. In particular, in the type of note book and miniaturized-portable information apparatus, such tendency is great. However, if an illumination apparatus is great in energy consumption, most of an electric power generated in a battery is to be consumed in this illumination apparatus.

Therefore, without any fluorescent lamp, in place of it, what uses a white light emitting diode has been developed, and the present applicant has filed a patent application (No. Hei 10-182076). The basic construction is explained based on FIG. 2. In this system, above a liquid crystal panel 1, a transparent substrate 2 is overlapped, accordingly a viewer from the above is adapted to be able to observe the indication of the liquid crystal panel 1 through the transparent substrate 2.

The shape of the transparent substrate 2 is square viewing from the upper as well as the liquid crystal panel 1 and at the one end thereof a light conductive member 3 is disposed. Although the liquid crystal panel 1 and the transparent substrate 2, and the transparent substrate 2 and the light conductive member 3 are depicted separated respectively in figure, actually those are disposed close. On the surface of the transparent substrate 2 a plurality of groove portions 2a which are parallel each other and triangular in section as a light path conversion means (See FIG. 3). The light conversion means is provided also on one portion of the light conductive member 3.

On both ends of the light conductive member 3, a light emitting diodes (LED) 4, 4 as a light emitting body are disposed. This light emitting diode 4 is disposed separate from the light conductive member 3 in figure, but actually it is close to the light conductive member 3. The light emitting color of the light emitting diode 4 is white, and it is surrounded by a case etc. in such a manner as most of the light is adapted to be directed toward the light conductive member 3 when emitting the light by being supplied with electric current.

In this construction, when the light emitting diode 4, 4 is emitted, the light thereof enters the transparent substrate 2 through the light path conversion member 3a of the light conductive member 3. And, that light is reflected with the groove portion 2a of the transparent substrate 2 and emitted toward the liquid crystal panel 1 to illuminate it. The indication of the liquid crystal panel 1 is observed by the observer through the transparent substrate 2.

In the construction explained above, the light conductive member 3 is provided with the light path conversion means. As the light path conversion means, there are what is formed by coarsening the surface of one portion of the light conductive member 3, by coating white on one portion of the light conductive member 3 and by providing continuously a prism shape portion 3a on one portion of the surface of the light conductive member 3 as shown in figure. In that construction, the light from the light emitting diode 4 is led to the light conductive member 3 and refracted to the transparent substrate 2 through the light path conversion means of the light conductive member 3.

What is explained above is a theoretical structure, and in an actual use, mostly the structure is as shown in FIG. 4. That is, at a rear side of the light conductive member 3 a reflection member 5 is disposed, which may direct the rearward leaked light from the light conductive member 3 toward the front to increase the use efficiency of the light. And, between the light conductive member 3 and the transparent substrate 2 a diffusion plate 6 is disposed in order to improve a visual property. That is, since merely the prism shape portion 3a as a light path conversion means lights, the reflected light looks like a stripe like a bright, a dark, a bright, a dark. In order to prevent it, the light is adapted to be diffused to increase the visual property.

When making the light emitting diode 4 emitted, one component 7a of the light 7 enters the light conductive member 3 from the end thereof, and the light entered into the light conductive member 3 is confined within it due to the difference of light refractivity of the air and the light conductive member 3 and then merely the light reflected with the light path conversion means is emitted. That is, the light reflected and refracted with the prism shape portion 3a as a light path conversion means enters the transparent substrate 2. The other component 7b does not enter the light conductive member 3 but directly enters the transparent substrate 2 to become a twinkling linear (hereinafter referred to as "a direct twinkle line").

The above direct twinkle line has been found to appear at the time of assembling every member in offset manner. Accordingly, generation of the twinkle line can be avoided by assembling the members correctly. However, on the other hand, in the transparent substrate 2, twinkle lines other than this direct twinkle line is recognized to be generated.

FIG. 5 is to show that. According to the state which is shown in FIG. 5, every member to be assembled is assembled correctly without being offset. In this state, although one component 7a of the light of the light emitting diode 4 enters the light conductive member 3 and is reflected and refracted with the prism shape portion 3a as a light path conversion means to enter the transparent substrate 2, the end face 3b of the light conductive member 3, when viewing the transparent substrate 2 from left-right direction (in parallel with the light path conversion means 2a), looks a twinkling band-like 7c by being reflected (Fresnel) with the light path conversion means 2a and the lower surface 2b of the transparent substrate 2 to deteriorate the visualization of the transparent substrate 2, which is called a transferred twinkle line.

As stated above, although the direct twinkle line can be prevented from being generated by assembling every members without any offset positioning, it is impossible to avoid the transferred twinkle line by the same method from the nature of the phenomena. Therefore, the present inventors have conducted a various tests and after many trials and errors, eventually succeeded to prevent the transferred twinkle line from being generated by changing the disposing position of the light emitting diode.

SUMMARY OF THE INVENTION

The present invention is to provide a concrete structure to solve the above problem, in a spread illuminating apparatus, in which on one end of a transparent substrate, a bar-like light conductive member 3 on one portion of which is provided with a light path conversion means is disposed, by disposing a light emitting body on one end of the light conductive member, the light from the light emitting body enters the transparent substrate, the length of the light conductive member is made longer than the size of the width of the transparent substrate to make the both ends of the light conductive member projected from both sides of the transparent substrate.

According to the above structure, the end face of the light conductive member is not transferred in the transparent substrate and does not become a transferred twinkle line.

DETAILED DESCRIPTION OF THE PREFERRED EMBODIMENT

Figure 1:
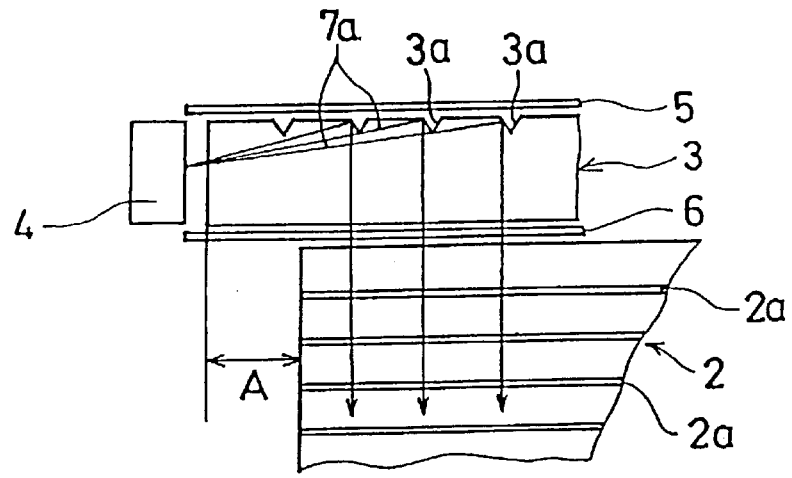
FIG. 1 shows an embodiment of the present invention.
Figure 2:
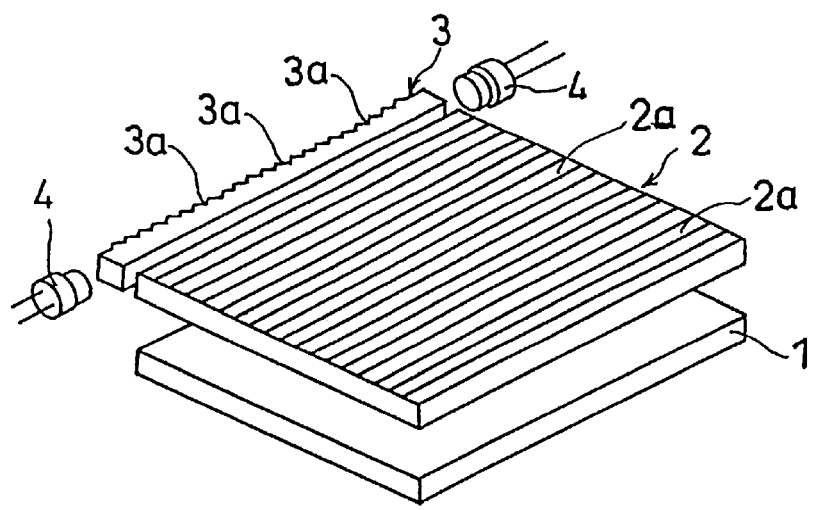
FIG. 2 is a perspective view showing a general construction of a spread illuminating apparatus.
Figure 3:
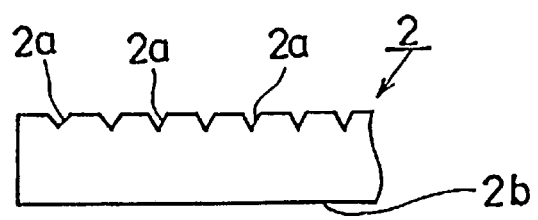
FIG. 3 is a side view showing the groove portion of FIG. 2.
Figure 4:
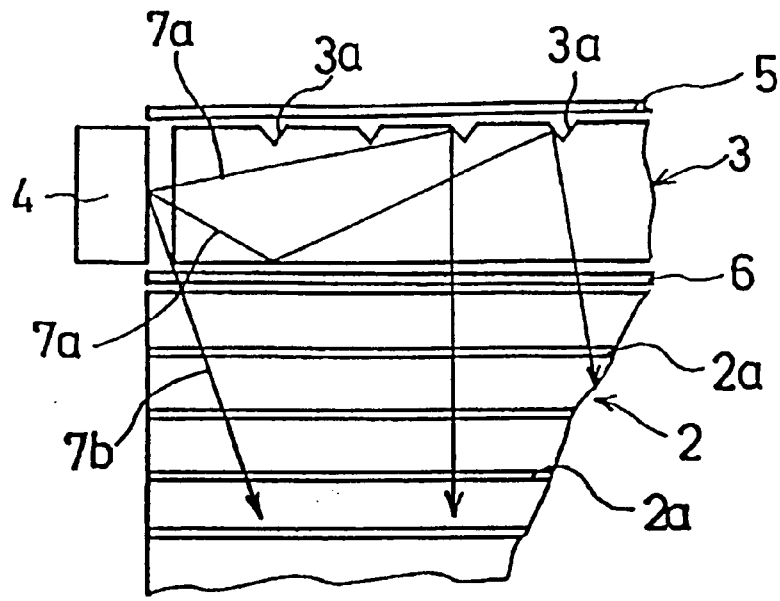
FIG. 4 is an explanation drawing explaining the function of the conventional structure.

Hereinafter, one embodiment of the present invention is explained based on FIG. 1, in which the present invention is applied to an display for a miniaturized and portable information appliance. In this embodiment, the length of the light conductive member 3, a reflecting member 5 and a diffusion plate 6 is made to be longer than the width size of the transparent substrate 2. And, the both ends of the light conductive member 3 are projected from the side end of the transparent substrate 2 by A, accordingly the position of the light emitting diode 4 is naturally changed.

By this position change of the light emitting diode 4, the end of the light conductive member 3 is also changed to become close to the light emitting diode 4, which makes the end of the light conductive member 3 separated from the side of the transparent substrate 2. Then, the end of the light conductive member 3 is not reflected on the transparent substrate, accordingly the transferred twinkle line is not generated.

The concrete dimension of the above embodiment is as follows. The width of the transparent substrate 2 is 40 mm, the depth is 30 mm, the thickness is 1 mm. And, the angle of the valley portion of the groove portion 2a provided on the surface of the transparent substrate 2 is 60° and the inclination angle thereof is 45°. The width of the light conductive member 3 is 3 mm, and facing to both end a light emitting diode 4 is disposed respectively (a second one of the light emitting diode 4 is not shown). The projection amount A of the light conductive member 3 from the side end of the transparent substrate 2 is 3 mm.

Figure 5:
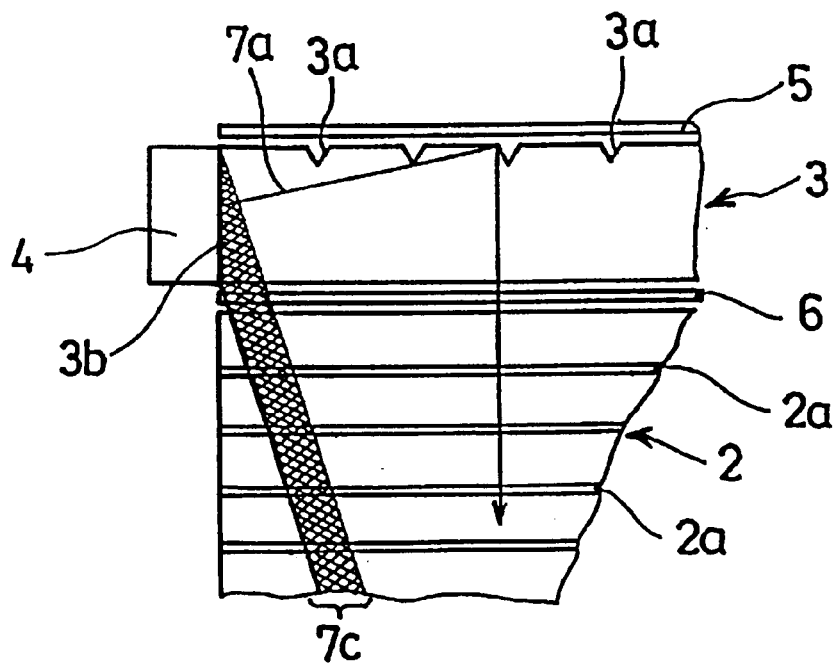
FIG. 5 is an another explanation drawing explaining the other function of the conventional structure.

In this construction, when the electric current is applied to the light emitting diode 4 and made it emitted, not only the direct twinkle line but also the transferred twinkle line which was generated in the conventional structure shown in FIG. 5. was not generated.

Although each embodiment of the above is relating to a display for a miniaturized and portable information device, the present invention is not limited thereto but applied to larger display of such as a person-com. Further as to the light emitting diode, two may be disposed at both ends respectively, but one of them or merely one may be disposed at one end. or two or more may be disposed at one end.

Thus, according to the present invention, by the quite simple structure the twinkle line can be prevented from being generated.

What is claimed is:

1. A spread illumination apparatus comprising:
   a transparent substrate having a width;
   a light conductive member having a light conversion means, said light conductive member having a length;
   the length of the light conductive member is set larger than the width of the transparent substrate; and
   light emitting bodies, wherein said light emitting bodies are disposed at ends of the light conductive member, so that the light emitted from the light emitting bodies enters the transparent substrate by way of the light conductive member, and the light emitting bodies on the ends of the light conductive member are projected from the end of the transparent substrate.

2. A spread illuminating apparatus in which a bar-like conductive member having a light path conversion means at a portion thereof is provided at one end of a transparent substrate having a light emitting body disposed on at least one of both ends of the bar-like light conductive member in which light from the emitting body is adapted to enter the transparent substrate by way of the light conductive member,
   wherein a length of the bar-like light conductive member is set larger than the width of the transparent substrate and that any of the bar-like conductive member's ends at least of which one or more of the light emitting bodies are disposed is projected from the side of the transparent substrate.

* * * * *